United States Patent
Hojyo et al.

(10) Patent No.: US 6,688,986 B2
(45) Date of Patent: Feb. 10, 2004

(54) MOUNTING STRUCTURE FOR A CAM-TYPE TORQUE DAMPER

(75) Inventors: Atsuo Hojyo, Saitama (JP); Naoki Kohno, Saitama (JP); Hiroatsu Inui, Saitama (JP); Kazuho Nakai, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/949,802

(22) Filed: Sep. 12, 2001

(65) Prior Publication Data
US 2002/0032060 A1 Mar. 14, 2002

(30) Foreign Application Priority Data
Sep. 12, 2000 (JP) ........................................ 2000-277067

(51) Int. Cl.[7] .................................................. F16D 7/04
(52) U.S. Cl. ............................ 464/39; 464/38; 464/37; 192/56.1
(58) Field of Search ...................... 464/37–39; 192/56.1, 192/56.61

(56) References Cited

U.S. PATENT DOCUMENTS

| | | | | |
|---|---|---|---|---|
| 4,373,924 A | * | 2/1983 | Schuhmacher | 192/56.61 |
| 4,734,080 A | * | 3/1988 | Kronert | 464/26 |
| 5,690,313 A | * | 11/1997 | Pesovic et al. | 251/81 |
| 6,280,332 B1 | * | 8/2001 | Knutson | 464/59 |

FOREIGN PATENT DOCUMENTS

JP           2002-87081 A    *   3/2002

* cited by examiner

Primary Examiner—Gregory J. Binda
Assistant Examiner—Aaron Dunwoody
(74) Attorney, Agent, or Firm—Birch, Stewart, Kolasch & Birch, LLP

(57) ABSTRACT

A mounting structure for a cam-type torque damper is provided to ease the assembling thereof, improve the maintenance properties thereof and prevent the variation in thrust direction restricting position due to loosening or the like. A collar is spline connected to an axial end of a crankshaft, and a primary gear, a lifter, a spring and a spring holder are fitted on the collar in that order. A cotter is fitted in a groove in the collar so as to restrict the spring holder with respect to the thrust direction position to thereby assemble the cam-type torque damper into a small assembly. The cam-type torque damper so made to be a small assembly is then fastened to the axial end of the crankshaft with a bolt. A concave cam is formed in a side of the primary gear, and a convex cam provided in an axial end portion of the lifter is brought into mesh engagement with the concave cam.

8 Claims, 6 Drawing Sheets

MOUNTING STRUCTURE FOR A CAM-TYPE TORQUE DAMPER

BACKGROUND OF THE INVENTION

1. Field of the Invention

The present invention relates to a mounting structure for a cam-type torque damper for use in damping torque variation when power is transmitted from, for example, a crankshaft of an engine to a primary gear.

2. Description of the Background Art

An example of a cam-type torque damper of this kind is shown in FIG. 6. This device is spline connected with a collar 102 on an outer circumferential surface of an axial end portion of a crankshaft 101, and a primary gear 103 is rotatably fitted on the collar 102. A concave cam 104 is formed in a side of the primary gear 103, and a lifter 106 having a convex cam 105 formed at one end thereof for mesh engagement with the concave cam 104 is fitted on the collar 102 axially movably through spline connection. Furthermore, a spring 107 is provided for biasing the lifter 106 toward the primary gear 103, and the spring 107 is supported at one end thereof by a spring holder 108. This spring holder 108 is fixed with a nut 109 which is held in a distal end of the collar 102 and screwed to a distal end of the rotating crankshaft 101.

With the construction described above, when there occurs a torque variation in the crankshaft 101 and an excessive torque is transmitted, the lifter 106 is moved axially outwardly of the collar 102 against the spring 107 through the mesh engagement of the concave cam 104 with the convex cam 105, and the excessive torque is designed to be damped by virtue of a radial reaction force at the mesh engagement portion of the concave cam 104 with the convex cam 105.

In the case of the above construction, since the cam-type torque damper is assembled by assembling all the constituent components onto the axial end of the crankshaft 101 sequentially, they are required to be so assembled on the assembly line of vehicle bodies. This increases the assembling time on the assembly line, and therefore improvement of the assembling properties is desired. In addition, the performance of the cam-type torque damper with respect to mounting structure cannot be guaranteed on the assembly line. Also, since many labor hours are required to assemble and disassemble the cam-type torque damper, improvement of the maintenance properties is desired.

Furthermore, since the positioning means for positioning the spring holder 108 with respect to the thrust direction and the mounting means for mounting the cam-type torque damper itself on the rotating shaft become the same, and more specifically, since fastening by the nut 109 is used as such means, in the event that there occurs loosening at the fastened portion, this may cause a risk that the performance of the product varies, and therefore a structure free from loosening is desired.

SUMMARY OF THE INVENTION

It is therefore an object of the present invention to realize the aforesaid desires and solve the above problems by provided a mounting structure for a cam-type torque damper comprising a collar mounted on a rotating shaft for rotation together with the rotating shaft and a gear movably supported on the collar, a lifter having a cam formed thereon for abutment with a side of the gear and adapted to move axially over the collar, a spring for biasing the lifter toward the gear, and a spring holder for fixing one end of the spring, wherein torque variations generated on the rotating shaft are damped by virtue of a reaction force of the spring generated as the lifter moves. The mounting structure is characterized in that the gear, the lifter, the spring and the spring holder are assembled onto the collar in that order, and that the spring holder is positioned with respect to a thrust direction by a positioning member mounted on an outer circumference of the collar.

As this occurs, the positioning member may be a cotter pin or a circlip that is fitted in an annular groove formed in the outer circumference of the collar.

Since the thrust direction position of the spring holder is fixed to the collar with the positioning member, the cam-type torque damper can be pre-assembled together as an integral unit, and then attached to the crankshaft traveling on the assembly line. Then, the assembled cam-type torque damper can be mounted on the rotating shaft with a bolt or the like, and the damper is made integral with the rotating shaft. Consequently, since the pre-assembled cam-type torque damper can be attached as a small assembly on the assembly line of the vehicle bodies, the performance of the cam-type torque damper can be guaranteed, and moreover the assembling speed on the assembly line of vehicle bodies can be increased. In addition, since assembling and disassembling at the time of servicing becomes easy and quick, the maintenance properties are improved.

Since the thrust direction positioning means for the spring holder and the mounting means for mounting the spring holder on the rotating shaft are separated, the position of the spring holder with respect to the thrust direction can be made constant. In addition, since no loosening occurs in the thrust direction positioning means, the performance of the cam-type torque damper can be maintained over a long period of time.

When the load of the spring as the positioning means is relatively small, the circlip can be used, and the fixation can be attained simply with the circlip. In contrast, when the load of the spring is large, the cotter may be used to adjust the required strength freely by adjusting the thickness thereof.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 3:
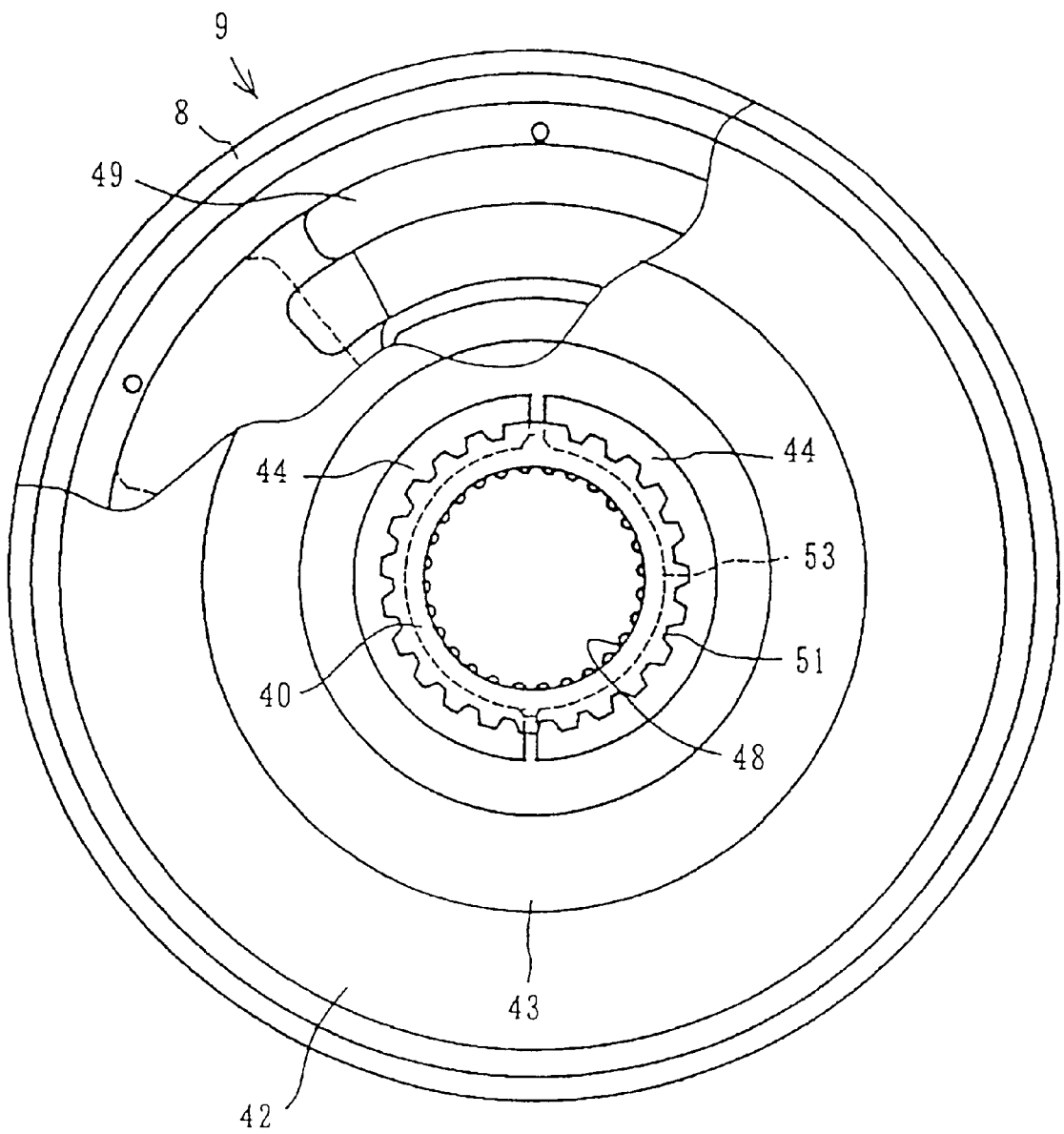
FIG. 3 is a view as viewed in a direction indicated by an arrow A in FIG. 2.
Figure 4:
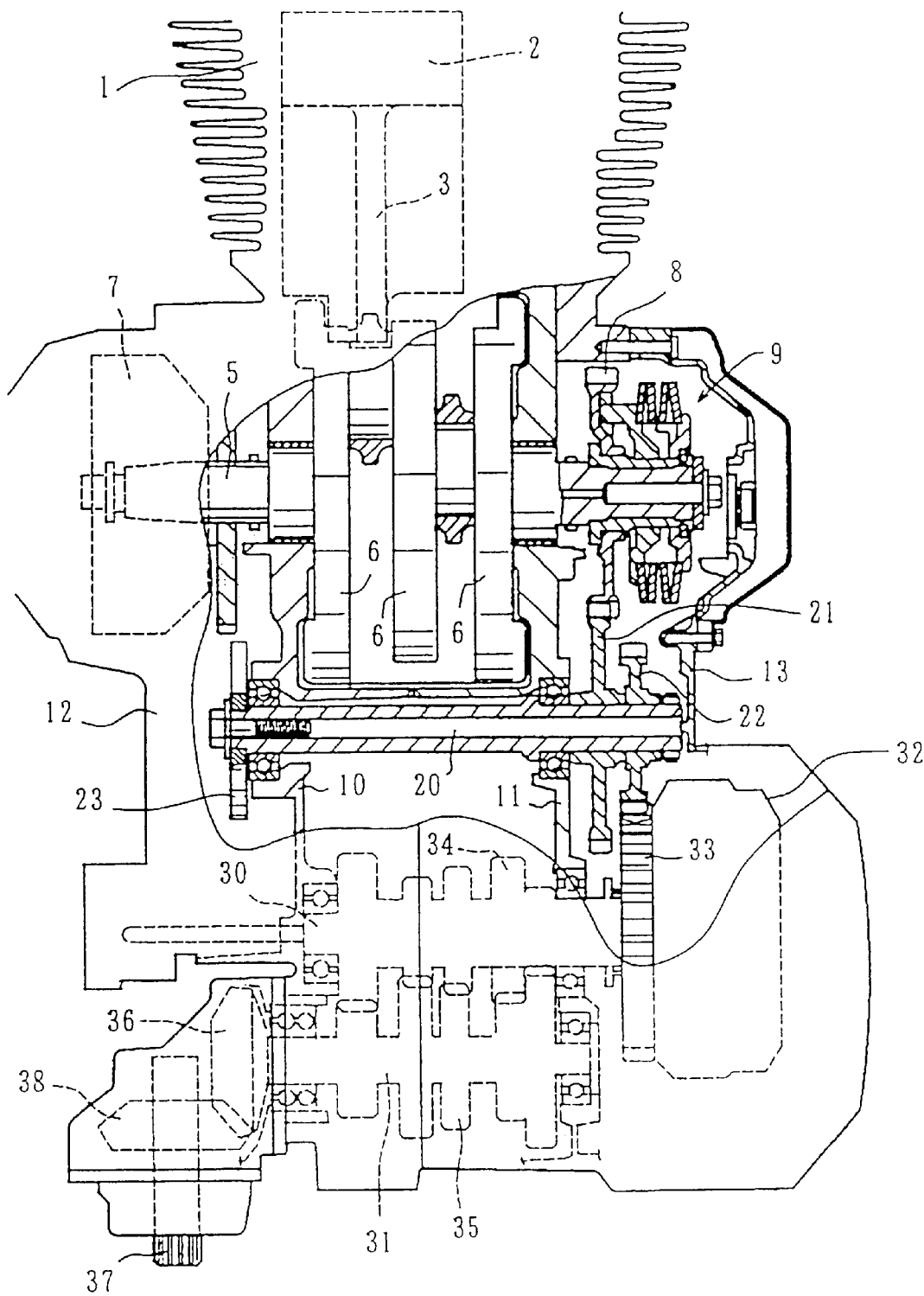
FIG. 4 is a diagram showing an engine, partially cut away, for illustrating a power transmission structure of a V-type engine for a motorcycle to which the cam-type torque damper is applied.

A first embodiment will now be described with reference to FIGS. 1–4 in which the invention is applied to a motorcycle engine. As shown in FIG. 4, reference numeral 1 denotes one of cylinders of a V-type engine, 2 denotes a piston, 3 denotes a connecting rod, 5 denotes a crankshaft and 6 denotes a web for the crankshaft. A generator 7 is provided at one end of the crankshaft 5, and a primary gear 8 and a primary damper 9 which is a torque damper are provided on the other end. The crankshaft 5 is supported by a left case 10 and a right case 11 which constitute a crankcase. Reference numeral 12 denotes a left case cover and 13 denotes a right case cover.

Power from the primary gear 8 is transmitted to a drive shaft (not shown) by way of an intermediate shaft follower gear 21 provided at one end of an intermediate shaft 20 disposed in parallel with the crankshaft 5, an intermediate shaft drive gear 22 which is concentric with the intermediate shaft follower gear, a primary driven gear 33 of a clutch 32, a main shaft 30, a main gear train 34, a counter gear train 35, a counter shaft 31, bevel gear 36, a bevel gear 38 and an output shaft 37, and drives a drive wheel such as a rear wheel through shaft drive. Note that a balancer weight 23 is provided on the other end of the intermediate shaft 20.

Figure 1:
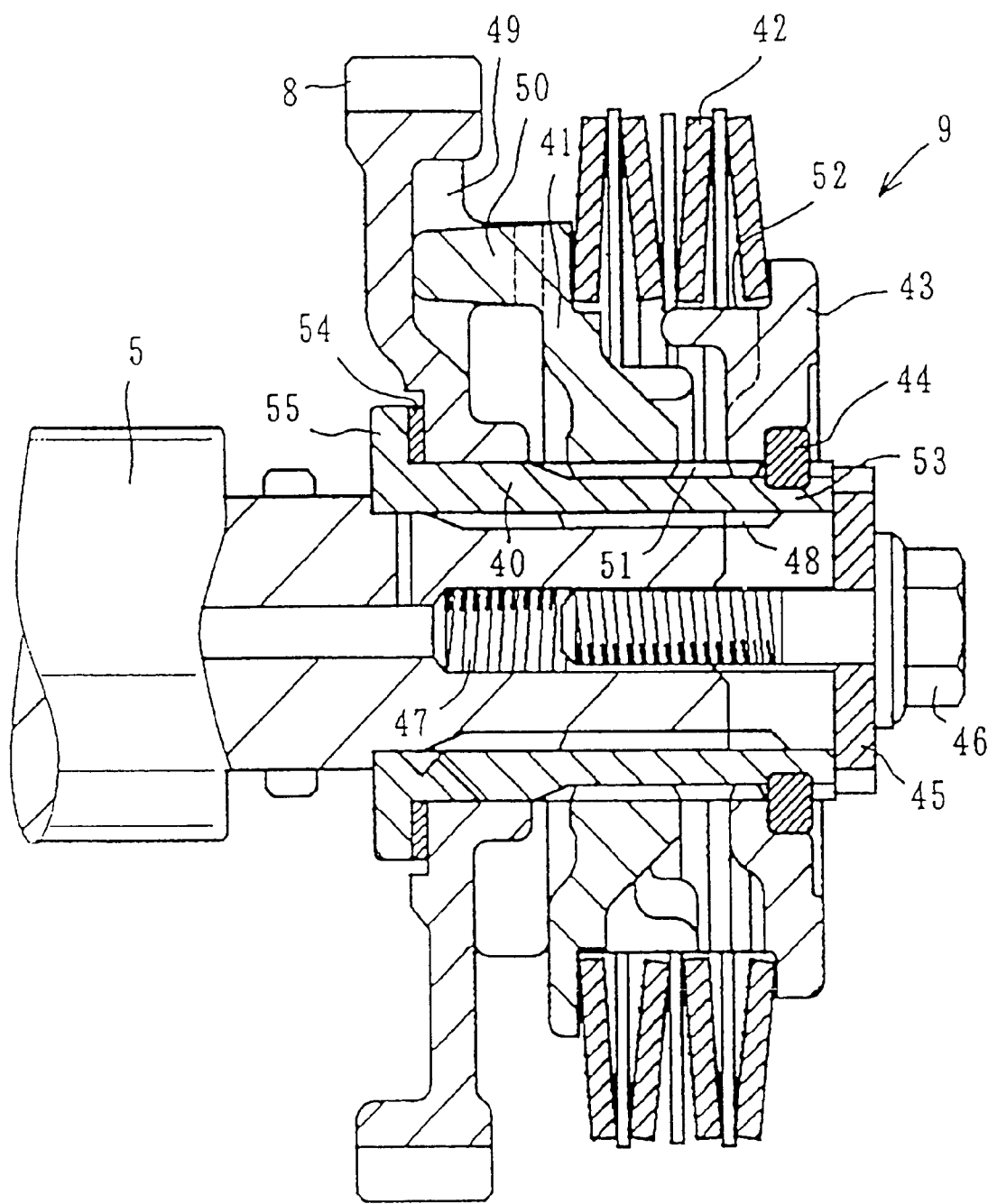
FIG. 1 is an enlarged cross-sectional view showing a mounting structure for a cam-type torque damper according to a first embodiment.

Next, the detailed construction of the primary damper 9 which is a cam-type torque damper according to the invention will be described. As is clear in FIG. 1, provided on the crankshaft 5 are a primary gear 8, a collar 40, a lifter 41, a spring 42, a spring holder 43 and a cotter 44, and thus the primary damper 9 is made as a small assembly. This cam-type torque damper which is made as a small assembly is detachably attached to the crankshaft 5 by being fastened into a nut portion 47 formed in an axial center portion at an axial end of the crankshaft 5 with a bolt 46 via a washer 45.

The collar 40 is connected with a spline 48 to an outer circumference of the crankshaft 5 in such a manner as to rotate together with the crankshaft 5. The primary gear 8 is rotatably fitted on the collar 40 and a concave cam 49 is formed in one side of the primary gear 8. This concave cam 49 is adapted to mesh with a convex cam 50 formed at one end portion of the lifter 41 which is situated on a primary gear 8 side. The lifter 41 is spline connected with a spline groove 51 formed in an outer circumference of the collar 40 in such a manner as to move in axial directions. When an excessive torque is inputted in the crankshaft 5, the lifter 41 moves over the collar 40 in the axial direction through mesh engagement of the concave cam 49 and the convex cam 50, and the excessive torque so inputted is then absorbed by a radial reaction force at the mesh engagement portion of the concave cam 49 with the convex cam 50.

The spring 42 is constituted by a coned disc spring and biases the lifter 41 toward the primary gear 8. However, various types of known elastic members such as a coil spring may be used for the spring 42. The spring holder 43 allows one end of the spring 42 to be fixed to a shoulder portion 52 provided on an outer circumferential portion thereof, is spline connected with the spline groove 51, and is fixed with the cotter 44 with respect to the thrust direction position. The cotter 44 uses members corresponding to a pair of arc-like halves which are cut from a ring-like member and is fitted in an annular groove 53 formed in an outer circumference at an axial end of the collar 40. Reference numeral 54 denotes a washer, and 55 denotes a flange of the collar 40.

Figure 2:
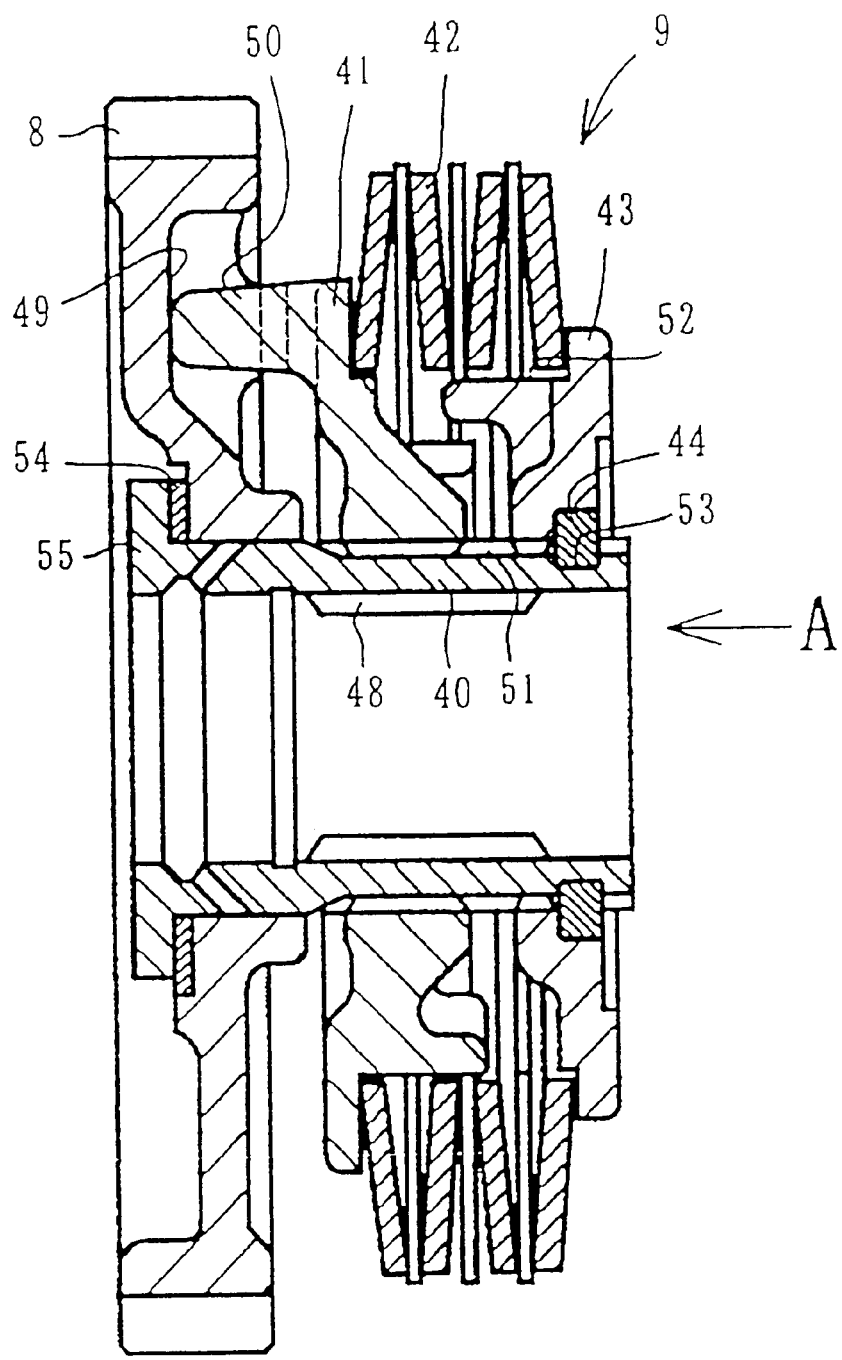
FIG. 2 is an enlarged cross-sectional view of the cam-torque damper.

In assembling the cam-type torque damper 9, as shown in FIG. 2, the washer 54, the primary gear 8, the lifter 41, the spring 42 and the spring holder 43 are fitted on the collar 40 in that order, and the cotter 44 is fitted in the annular groove 53, whereby the spring holder 43 is fixed with respect to the thrust positional position. This allows the cam-type torque damper 9 to be assembled as a small assembly, and the cam-type torque damper 9 may be handled and carried by hand or freely be assembled and disassembled in this state. FIG. 3 is a view as viewed in a direction indicated by an arrow in FIG. 2 and illustrates how a pair of cotters 44, 44 are mounted.

Next, the operation of the embodiment will be described. As shown in FIG. 2, the cam-type torque damper 9 is assembled as a small assembly by fixing the spring holder 43 with cotters 44. Consequently, in mounting the cam-type torque damper 9 on the crankshaft 5, since the cam-type torque damper only has to be fastened to the axial end of the crankshaft 5 with the washer 45 and the bolt 46 on the assembly line, as shown in FIG. 1, easy and quick mounting becomes possible, and the assembling properties are improved.

Moreover, since disassembling and assembling at the time of servicing also becomes simple, the maintenance properties are improved. Since the performance of the cam-type torque damper 9 can be verified at a stage where the damper has been assembled to a small assembly, the performance of the cam-type torque damper 9 as a single unit can be guaranteed.

Furthermore, since the thickness of the cotter 44 can freely be adjusted, in the event that the thickness is adjusted to the load of the spring 42, variation in load of the spring 42 can be dealt with easily. In addition, the cotter 44 is made to function only as a positioning member for the spring holder 43, and the function of the fixing means for mounting the cam-type torque damper 9 on the crankshaft 5 is separated and assigned to the bolt 46, and therefore there occurs no risk that the fastened portion gets loosened and the fixed thrust position of the spring holder 43 is changed and the performance varies, whereby the performance can be maintained stably.

Figure 5:
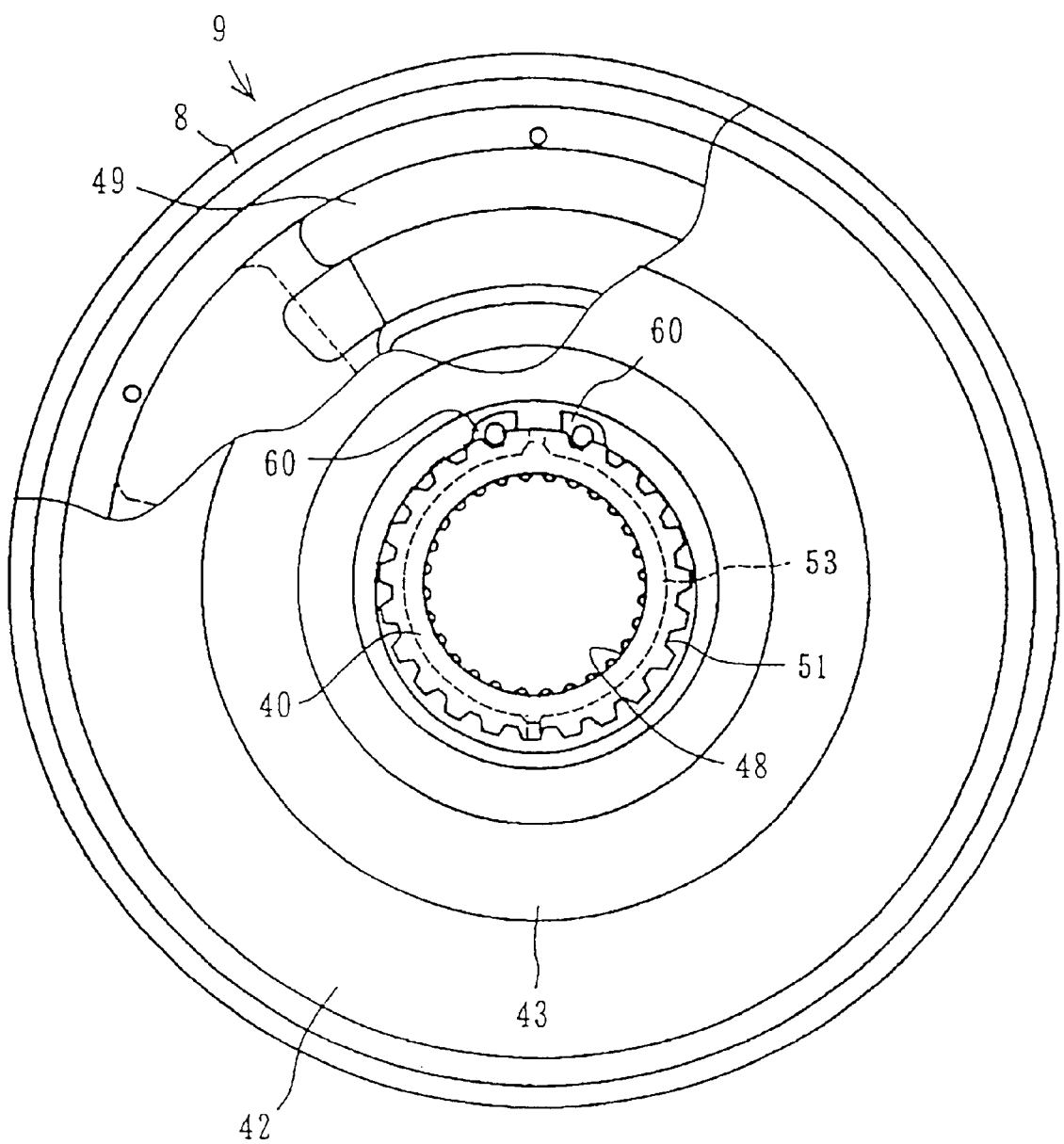
FIG. 5 is a diagram relating to a second embodiment and similar to FIG. 3.
Figure 6:
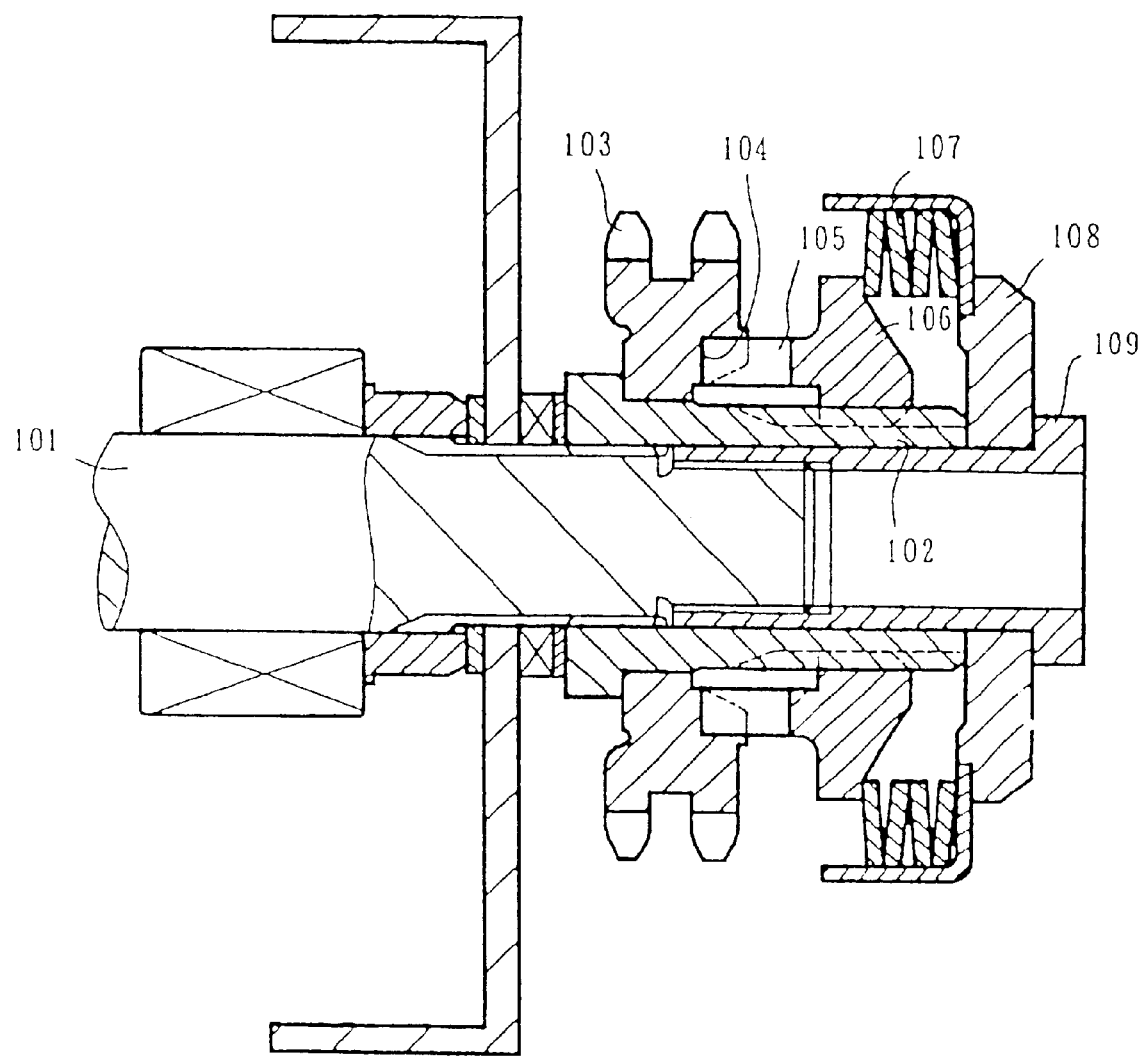
FIG. 6 is a cross-sectional view of a conventional cam-type torque damper.

FIG. 5 relates to a second embodiment and is similar to FIG. 3, and in this embodiment, a circlip 60 is used as the positioning member instead of the cotter 44 so used in the previous embodiment. With this construction, in a case where the load of the spring 42 is not significantly great, the assembly can be made simple using the circlip 60.

Note that the invention is not limited to each of the embodiments but may be varied or modified in various ways, and for example, as an application, the cam-type torque damper may appropriately be provided at suitable portions along the length of the power transmission path, not on the crankshaft.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A torque damper, comprising:

a collar having an outer circumference;

a gear rotatably supported on said collar, said gear having a first cam formed thereon;

a lifter axially movable along said collar, said lifter having a second cam formed thereon for abutment with said first cam of said gear;

a spring holder mounted on said outer circumference of said collar;

a spring located between said lifter and said spring holder for biasing said lifter toward said gear; and a positioning member mounted on said outer circumference of said collar and securing said gear, said lifter, said spring and said spring holder to said collar, wherein said lifter is spline connected with a spline groove formed in said outer circumference of said collar.

2. A torque damper, comprising:

a collar having an outer circumference;

a gear rotatably supported on said collar, said gear having a first cam formed thereon;

a lifter axially movable along said collar, said lifter having a second cam formed thereon for abutment with said first cam of said gear;

a spring holder mounted on said outer circumference of said collar;

a spring located between said lifter and said spring holder for biasing said lifter toward said gear; and a positioning member mounted on said outer circumference of said collar and securing said gear, said lifter, said spring and said spring holder to said collar, wherein said spring holder is spline connected with a spline groove formed in said outer circumference of said collar.

3. A torque damper, comprising:

a collar having an outer circumference;

a gear rotatably supported on said collar, said gear having a first cam formed thereon;

a lifter axially movable along said collar, said lifter having a second cam formed thereon for abutment with said first cam of said gear;

a spring holder mounted on said outer circumference of said collar;

a spring located between said lifter and said spring holder for biasing said lifter toward said gear; and a positioning member mounted on said outer circumference of said collar and securing said gear, said lifter, said spring and said spring holder to said collar, wherein said collar includes a spline groove formed in said outer circumference thereof, said lifter is spline connected with said spline groove, and said spring holder is spline connected with said spline groove.

4. The torque damper as set forth in claim 3, wherein said first cam on said gear is a concave cam, and said second cam on said lifter is a convex cam.

5. The torque damper as set forth in claim 4, wherein said positioning member is a cotter that is to be fitted in an annular groove formed in said outer circumference of said collar.

6. The torque damper as set forth in claim 5, wherein said cotter includes a pair of arc-shaped halves.

7. The torque damper as set forth in claim 4, wherein said positioning member is a circlip that is to be fitted in an annular groove formed in said outer circumference of said collar.

8. The torque damper as set forth in claim 4, wherein said spring comprises a coned disc spring.

* * * * *